Patented Oct. 18, 1927.

1,645,793

UNITED STATES PATENT OFFICE.

ROY H. BROWNLEE, OF PITTSBURGH, PENNSYLVANIA.

DENTIFRICE.

No Drawing.   Application filed October 13, 1926.   Serial No. 141,427.

This invention relates to a dentifrice and constitutes a continuation in part of application Serial No. 109,164, filed May 14, 1926.

As in the above noted application, one object of the present invention is to provide a dentifrice which has no injurious effect upon the tissues or glands of the mouth; and which possesses particularly advantageous properties for cleansing the teeth and gums, and for the general care of the oral cavity.

The specific object of the present invention is to increase the antiseptic action of the dentifrices of the above noted inventions, without detracting from their cleansing properties, and without imparting an injurious effect or unpleasant odor to them.

In such applications the dentifrices comprise as their chief active ingredient, or ingredients, one or more halides of aliphatic hydrocarbons.

As the most suitable examples of such halides of aliphatic hydrocarbons, carbon tetrachloride (tetrachlor methane), and ethyl iodide may be particularly noted.

Other halides of methane itself may be used instead of the carbon tetrachloride, and halides of the other members of the series may also be substituted therefor. Of the other halides of methane, di-iodo methane ($CH_2I_2$) may be used in the composition if so desired. Of the trihalides of methane, chloroform ($CHCl_3$) may be used, but bromoform ($CHBr_3$) and iodoform ($CHI_3$) as commercially available, have too penetrating and unpleasantly pungent an odor to render their use in a dentifrice desirable. Although chloroform may be used, its high rate of evaporation renders it a less desirable ingredient than carbon tetrachloride or ethyl iodide.

Of the tetra halides of methane, tetrachlor methane has been given above as one of the substances of greatest suitability, because of its physical properties and ready availability. Of the other tetrahalides, carbon tetrabromide ($CBr_4$), and carbon tetraiodide ($CI_4$), the tetraiodide possesses physical properties which render its use possible and desirable in a dentifrice.

Of the halides of the higher members of the paraffin series various members may be advantageously utilized.

In regard to any of these substances, it may be stated as a general principle that the more desirable are those having a boiling point between twenty-five degrees centigrade and one hundred and fifty degrees centigrade. To express the matter differently, the more desirable are those which are liquids at room temperature and atmospheric pressure. The compounds having a boiling point lower than twenty-five degrees centigrade tend to evaporate from or separate in the composition, while those which are solid at room temperature and atmospheric pressure are too inactive to impart the desired qualities to the dentifrice.

The halogen substitution products of several of the ethylene series of hydrocarbons may also be used in the dentifrice. Of these the most suitable members are ethylene chloride ($C_2H_4Cl_2$) and methylene chloride ($CH_2Cl_2$). A number of the halides of the acetylene series also possess desirable characteristics, for example, the monohalides of propargyl.

It should be understood that a number of the halides of both the saturated and unsaturated series, which have physical properties rendering them suitable, are relatively so rare that their use in a dentrifice is rendered commercially impractical.

The above are the organic halides comprised in the noted copending applications, and comprise those liquid organic halides the use of which is desirable. The present invention consists in dissolving elemental iodine in one or more of the liquid organic halides.

It has been found that the elemental iodine increases the antiseptic properties of the dentrifice, without in any degree detracting from the cleansing action of the organic halide in which it is dissolved. The iodine is readily soluble in any of the organic halides given, its solubility in a few of them being as follows:

| Organic halide. | Solubility of iodine therein (%). |
|---|---|
| Carbon tetrachloride | 3 |
| Chloroform | 1.75 |
| Ethyl iodide | In excess of 10 |

In certain of the substances the solubility is less than in these examples.

A relatively small percentage of dissolved iodine is, however, sufficient to effect a marked increase in the antiseptic effect of the composition. Thus for most purposes the solution may comprise only approximately one-tenth of one per cent dissolved iodine.

For use as a dental preparation to give a particularly effective cleansing and disinfecting treatment to the teeth and gums, the elemental iodine may be merely dissolved in one or more of the organic halides, and this liquid solution used. To this mixture white mineral oil may be added, if desired, to retard evaporation of the solution or solutions.

A satisfactory composition may comprise the iodine solution and white mineral oil in substantially equal proportions. In this connection methyl iodide, which has a boiling point of only forty-three degrees centigrade, may be satisfactorily used as the organic halide serving as a solvent for the iodine, for the reason that in this connection there is less opportunity for evaporation of the active ingredient of the composition.

For use in a dentifrice, the iodine is first dissolved in the organic halide. This liquid solution is then mixed with white mineral oil. This mixture may then be added to the various other constituents of the dentifrice, such as calcium carbonate, magnesium carbonate, glycerine, soap solution, flavoring matter and water.

A dentifrice comprising the above noted, or similar, constituents contains neither gritty material which tends to wear down the teeth nor any active agent capable of exerting a solvent action thereon. It is capable of removing the mucin film from the teeth, thus permitting a thorough cleansing thereof; and serves also as an efficient germicide, and as a stimulant of the gums and other tissues of the oral cavity.

What I claim is:

1. A dental preparation comprising a halide of an aliphatic hydrocarbon, and elemental iodine dissolved in said organic halide.

2. A dental preparation comprising ethyl iodide, and elemental iodine dissolved therein.

3. A dentifrice comprising a halide of an aliphatic hydrocarbon having a boiling point between the limits of twenty-five degrees centigrade and one hundred fifty degrees centigrade, elemental iodine, filling material, and a white mineral oil.

4. A dentifrice comprising ethyl iodide, elemental iodine dissolved therein, filling material, and a white mineral oil.

In witness whereof, I hereunto set my hand.

ROY H. BROWNLEE.